United States Patent [19]

Sartori et al.

[11] 4,373,121

[45] Feb. 8, 1983

[54] MAINTENANCE TERMINATION DEVICE

[75] Inventors: Eugene F. Sartori, Madison; Francis J. Uhrhane, Cedar Knolls, both of N.J.

[73] Assignee: Bell Telephone Laboratories, Incorporated, Murray Hill, N.J.

[21] Appl. No.: 273,975

[22] Filed: Jun. 15, 1981

[51] Int. Cl.³ .............................................. H04B 3/46
[52] U.S. Cl. ............................................. 179/175.3 F
[58] Field of Search ........... 179/175.3 F, 78, 175.3 R; 324/52

[56] References Cited

U.S. PATENT DOCUMENTS 3,636,280 1/1972 Wetzel .............................. 179/175.3

FOREIGN PATENT DOCUMENTS 55-100773 7/1980 Japan ................................ 179/175.3

Primary Examiner—Stafford D. Schreyer
Attorney, Agent, or Firm—R. O. Nimtz

[57] ABSTRACT

Substantially identical, unique valued impedance termination networks (26,28) each comprising a resistor (32,38) and a capacitor (34,36) are connected between each telephone subscriber loop conductor (11,13) and ground at the entrance of the loop to the customer's premises (14). The impedance termination networks are balanced to ground for preventing noise from being induced in the loop. In response to an alternating current signal transmitted simultaneously on each conductor from a loop testing apparatus (10), if an impedance termination network is connected between a conductor and ground, the unique impedance value will be measured. The value of the measured impedance is compared with the unique impedance to determine whether there is an open conductor in the loop. Furthermore, a four-layer diode switch (30,40) is connected permanently in series with each loop conductor. In response to a signal greater than the diode threshold voltage, the diode switch breaks down and a path is established directly to the terminal equipment (16). In response to a signal below the threshold voltage the diode switch does not conduct and the loop appears open. Both opens and resistive faults in various sections of the loop may thus be detected and located without mechanically opening the loop.

9 Claims, 1 Drawing Figure

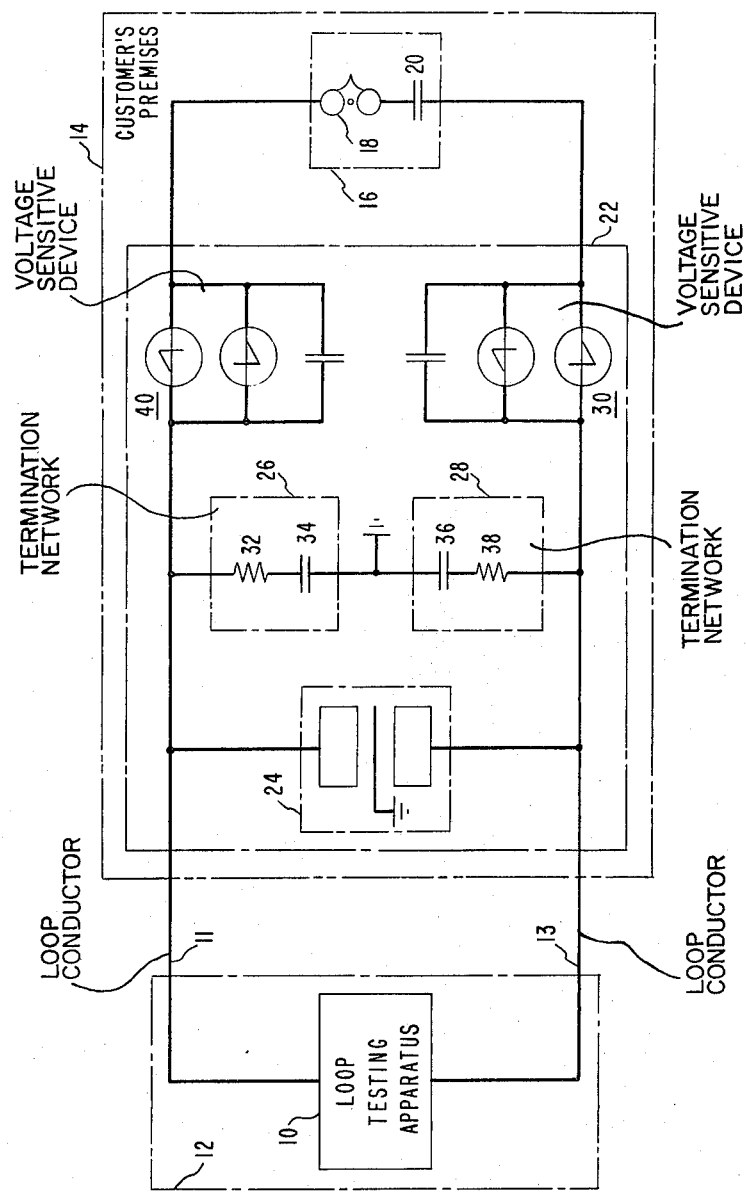

MAINTENANCE TERMINATION DEVICE

BACKGROUND OF THE INVENTION

1. Field of the Invention

This invention relates to telephone subscriber loop testing systems and, in particular, to a device for determining whether a fault in the subscriber loop is located between a telephone central office and the device or between the device and terminal equipment.

2. Description of the Prior Art

It is useful to know whether a fault in a telephone subscriber loop is located within the customer's premises or outside the premises so that an appropriate repairperson may be assigned to correct the fault. Known methods use a device, known generally as a maintenance termination unit (MTU), for the disconnection of the loop at the customer's premises and the connection of an impedance termination network across the conductors of the loop by means of relay contacts. In some MTU's, the termination network is connected permanently across the loop conductors.

If a loop is determined to be faulty on testing, the MTU is activated in response to an activate signal transmitted from a testing source—either at the telephone central office or a test center remotely located from the central office. That section of the loop between the central office and the MTU is tested again; if no fault is detected in this section, the fault is determined to be in the loop section between the MTU and the telephone set.

A problem with this method lies in the reliability of the MTU: making connection through relay contacts does not always insure a perfect connection because of dust or wear and tear; and reliability of component parts is another problem. Another problem relates to the increased time taken for testing because of mechanical operation. A further problem relates to the necessity for maintaining administrative records to determine whether a loop is equipped with such a device.

SUMMARY OF THE INVENTION

The aforementioned problems are eliminated by permanently connecting substantially identical impedance termination networks between each subscriber loop conductor and ground, at the entrance of the loop to the subscriber's premises. Each impedance termination network is designed to provide a special signature or impedance. Moreover, this signature is unique in that it is distinctly different from any known value which would normally be present on the loop, and different from known fault values.

Thus, in accordance with the illustrative embodiment of the present invention, in response to an alternating current signal applied from a testing source to each loop conductor simultaneously, a unique impedance value will be determined, thereby indicating the presence of the impedance termination networks connected to the conductors. Recordkeeping is not necessary for determining whether such termination networks are connected to the loop. If a loop conductor is open, the impedance measured on that conductor will be larger than the expected signature.

Also connected permanently in series with each loop conductor is a four-layer diode switch adjacent to the unique impedance termination. When a signal having a voltage greater than the breakdown voltage of the four-layer diode switch is applied to the loop conductor from the central office end, the diode switch conducts and a path is established between the central office and the customer's premises. When a signal having a voltage below the breakdown voltage of the diode switch is applied on the loop conductor at the central office end, the diode switch appears as an impedance of substantial value as if the conductor was open at that point. Using such diode switches, faults in a loop can be isolated as being located within a customer's premises or outside, without mechanically opening the loop.

An advantage of the present invention relates to speed of testing. Another advantage is the compatibility of this testing procedure with mechanized loop testing systems.

BRIEF DESCRIPTION OF THE DRAWING

The only FIGURE shows impedance termination networks connected between each telephone subscriber loop conductor and ground.

DETAILED DESCRIPTION

Referring to the drawing there are shown tip conductor 11 and ring conductor 13 of a telephone subscriber loop 11,13 connecting terminal equipment such as a telephone set 16 at a customer's premises 14 with a telephone central office 12. Shown connected to the loop 11,13 is a loop testing apparatus 10 which may be located at central office 12, as shown, or at a test center remote from central office 12.

At the entrance of the loop 11,13 to the customer's premises 14 there is connected in series with the loop a maintenance termination unit (MTU) 22 for determining whether a fault in the subscriber loop 11,13 is located between the central office 12 and the MTU 22 or between the MTU 22 and the telephone set 16.

The MTU 22 comprises: a loop protector 24 connected across tip conductor 11 and ring conductor 13; impedance termination network 26 connected between tip conductor 11 and ground; impedance termination network 28 connected between ring conductor 13 and ground; four-layer diode switch 30 connected in series with ring conductor 13; and four-layer diode switch 40 connected in series with tip conductor 11. Incorporation of loop protector 24 in the MTU 22 permits a single installation; MTU 22 may, however, also be manufactured without protector 24.

The four-layer diode switches 30 and 40 are substantially identical, each comprising in parallel a capacitor, a forward and a reverse connected four-layer diode. If a capacitor of sufficient voltage capability is not available, it is possible to shunt the capacitor with back-to-back zener diodes (not shown). In response to a direct current signal having a voltage level greater than the threshold voltage of the four-layer diode switches, the diodes break down and conduct, thereby providing a connection between the loop testing apparatus 10 and the telephone set 16. The diode switches 30,40 are selected so that the threshold voltage is below the value of signals normally present in the subscriber loop, such as talking battery. Diode switches 30,40 present a high impedance to any signal below the threshold voltage, thus effectively presenting an open subscriber loop.

Impedance termination network 26 comprises in series a resistor 32 and a capacitor 34. Likewise impedance termination network 28 comprises in series a resistor 38 and a capacitor 36. The values of the component parts are adjusted so that the impedance termination networks 26 and 28 are balanced between the loop conductors 11 and 13, respectively, and ground so that the loop will not be noisy. Each of the impedance termination networks 26 and 28 present a unique signature or impedance in response to an alternating current signal. The value of the impedance termination networks is selected so that at least two conditions are met: the unique impedance value selected should be less than the impedance of an open subscriber loop on the longest route; and the impedance value selected should not be characteristic of any known condition, or a fault. Whereas the impedance termination networks 26 and 28 disclose the use of a capacitor and a resistor in series, other combinations including inductors and semiconductor devices are equally feasible.

In accordance with the illustrative embodiment of the present invention, a set of signals comprising a direct current signal having a voltage greater than the threshold voltage of diode switches 30,40 and an alternating current signal is applied to tip conductor 11 at the loop testing apparatus 10. Simultaneously, a similar set of signals is applied from a separate signal source to the ring conductor 13 at the loop testing apparatus 10. This is test A. Test A provides information for determining the impedance, both a.c. and d.c. components, from tip conductor 11 to ground and ring conductor 13 to ground.

Subsequently, after test A is completed, the same set of signals, described hereinabove, is applied at the loop testing apparatus 10 to either tip conductor 11 or ring conductor 13, the other conductor being grounded at the loop testing apparatus 10. This is test B. Test B provides information for determining the impedance, both d.c. and a.c. components, between tip conductor 11 and ring conductor 13.

If a MTU 22 is connected to loop 11,13, when the aforesaid signals during test A are applied to the conductors 11 and 13 simultaneously, alternating current will flow through impedance termination networks 26 and 28, respectively, to ground. This alternating current flow will be detected at the loop testing apparatus 10. Because the alternating current voltages and currents are known, the impedances can be determined.

If an impedance thus determined is equal to the unique signature expected, the presence of a MTU in the loop is verified. No subscriber loop records, therefore, are necessary to indicate whether such a maintenance termination device is connected to the loop or not. In response to the aforesaid direct current signals being applied to each of the loop conductors 11 and 13, the diode devices 40 and 30, respectively, breakdown and conduct thereby providing continuous paths between telephone central office 12 and telephone set 16. Telephone set 16 is shown in the on-hook, or idle, state comprising in series a set of ringers 18 and a capacitor 20 connecting tip conductor 11 and ring conductor 13.

Furthermore, when the impedance measured between tip conductor 11 and ring conductor 13 in the aforesaid test B is that for a telephone set (or a combination of telephone sets), it is determined that the loop is properly terminated and has no tip to ring fault. If the measured impedances during test A between tip conductor 11 and ground, and ring conductor 13 and ground are each equal to the unique signature but no characteristic telephone impedance is measured between tip conductor 11 and ring conductor 13 during test B, it is determined that the loop conductors are continuous from the central office to the customer's premises with no telephone set connected to the loop, i.e., with an open loop beyond the MTU 22. If tip conductor 11 is open between central office 12 and impedance termination network 26 or if ring conductor 13 is open between central office 12 and impedance termination network 28, no appreciable alternating current flow will be detected at loop testing apparatus 10 as compared to alternating current flow when there is no open conductor, and the measured impedance will be greater than the unique signature.

If a direct current fault, such as a leak from either conductor 11 or 13 to ground, is present, direct current flow will be detected in that conductor at the loop testing apparatus 10 during test A. Likewise, a leak between conductors 11 and 13 will be detected during test B.

Multiple faults, such as combinations of opens and direct current faults, may also be detected from the information available after the aforesaid tests A and B have been completed.

In accordance with this invention, the aforesaid tests permit the detection of direct current faults and opens in either or both conductors of a telephone subscriber loop. It is necessary, however, to determine whether a fault, having been determined to exist, is located between central office 12 and the diode switches 30,40 or between the diode switches 30,40 and the telephone set 16.

The aforesaid sets of direct current signals and alternating current signals are removed from the loop conductors 11 and 13. A separate set of identical direct current signals from separate sources at the loop testing apparatus 10, each having a voltage less than the threshold voltage of the diode switches 30 and 40, are applied simultaneously to the loop conductors 13 and 11. This is test C. Because the value of each of the direct current signals in test C is below the threshold value of each diode switch 30,40, the diode switches 30 and 40 do not conduct and the loop appears as if it were open at the diode switches 30 and 40.

If there is a leak between either conductor 11 or 13, or both, and ground in the loop 11,13 between the central office 12 and the MTU 22, direct current flow will be detected at the loop testing apparatus 10. If there are no faults in this section, no direct current flow will be detected at the loop testing apparatus 10. If direct current flow was detected during the aforesaid test A, it can be inferred that the fault is located between the diode switches 30,40 and the telephone set 16.

In order to determine the location of a leak from one conductor to another, after test C described hereinabove has been completed, a direct current signal comprising one of the signals described in the aforesaid test C is applied to either tip conductor 11 or ring conductor 13 with the other grounded. This is test D. If there is a leak between the loop conductors 11 and 13 in the subscriber loop between central office 12 and MTU 22, direct current flow will be detected at the loop testing apparatus 10. If there is no leak between the loop conductors 11 and 13, no direct current flow will be detected because the diode switches 30 and 40 do not conduct. If direct current flow was detected, however, during the aforesaid test B, it can be inferred that the fault is located between the diode switches 30,40 and the telephone set 16.

The tests described hereinabove are compatible with mechanized loop testing systems, providing for rapid automatic testing of telephone subscriber loops.

What is claimed is:

1. A fault locating circuit (22) in a subscriber loop comprising a plurality of conductors (11,13) connecting a central office (12) with terminal equipment (16) for determining whether said fault is located on the central office side or the terminal equipment side of said locating circuit, said locating circuit comprising a plurality of voltage sensitive devices (30,40), each of said voltage sensitive devices being connected in series with one of said loop conductors between said central office and said terminal equipment, and a termination network comprising a plurality of substantially identical impedance termination networks (26,28), each of said impedance termination networks being connected permanently between different ones of said subscriber loop conductors (11,13) and ground on the central office side of said plurality of voltage sensitive devices.

2. The fault locating circuit according to claim 1 wherein said impedance termination networks (26,28) are balanced between said subscriber loop conductors (11,13) and ground, respectively, for preventing noise from being induced in said subscriber loop.

3. The fault locating circuit according to claim 1 wherein each of said impedance termination networks (26,28) comprises a resistor (32,38) and a capacitor (34,36) connected in series between different ones of said conductors and ground for providing a unique signature in response to an alternating current signal.

4. In a telephone subscriber loop comprising a plurality of conductors (11,13) connecting a telephone central office (12) with a terminal equipment (16) each of said conductors having a four-layer diode switch (30,40) connected in series therewith, a method for determining whether a fault in said subscriber loop is located on either said central office side or said terminal equipment side of each of said diode switches

CHARACTERIZED BY THE STEPS OF transmitting a first direct current signal having a voltage greater than the threshold voltage of said diode switches and an alternating current signal, simultaneously, between each of said conductors and ground, determining the impedance of each of said conductors to ground in response to said first direct current signal and said alternating current signal, and comparing said impedance values with unique signatures impedance termination networks (26,28) connected between said conductors and ground on the central office side of the diode switch, thereby determining (a) whether one of said impedance termination networks is connected to a respective one of said conductors, and (b) whether said conductors are open.

5. The method for determining faults in said subscriber loop according to claim 4 further

CHARACTERIZED BY THE STEPS OF detecting whether any direct current flow exists in any of said conductors, thereby determining whether any fault exists in said conductors.

6. The method for determining faults in said subscriber loop according to claim 5 further

CHARACTERIZED BY THE STEPS OF disconnecting said first direct current signal and said alternating current signal from one of said conductors and connecting said one conductor to ground, detecting if there is any direct current flow in said conductor thereby inferring whether any direct current leak exists between said conductors, and determining the impedance of said loop thereby detecting whether any said terminal equipment is connected to said loop conductors or whether said loop is open.

7. The method for determining faults in said subscriber loop according to claim 6 further

CHARACTERIZED BY THE STEPS OF disconnecting said first direct current signal, said alternating current signals, and said ground connection from said loop conductors, transmitting a second direct current signal having a voltage less than the threshold voltage of said diode switches simultaneously between each of said conductors and ground, and determining whether any direct current flow exists between any of said conductors and ground, thereby determining whether any fault exists to ground in any of said conductors between said central office and said diode switches.

8. The method for determining faults in said subscriber loop according to claim 7 further

CHARACTERIZED BY THE STEPS OF disconnecting said second direct current signal from one of said conductors and connecting said one conductor to ground, and detecting whether a direct current flow exists in said loop for determining whether a leak exists between said conductors on the central office side of said switches.

9. A maintenance termination unit (MTU) connected by a tip conductor and ring conductor between a central office and terminal equipment, said MTU comprising protection equipment connected between said tip and ring conductors, substantially identical signature networks, one of said signature networks being connected between said tip conductor and ground, the other of said signature networks being connected between said ring conductor and ground, each of said signature networks comprising a resistor and a capacitor connected in series, and substantially identical voltage sensitive devices, each of said voltage sensitive devices being connected in series with either said tip conductor or said ring conductor, and each of said voltage sensitive devices comprising in parallel a capacitor and two four-layer diodes, said two four-layer diodes being connected in opposite polarities said substantially identical signature networks being connected on the central office side of the diode switch.

* * * * *